· US011092006B2

(12) United States Patent
Jones et al.

(10) Patent No.: US 11,092,006 B2
(45) Date of Patent: Aug. 17, 2021

(54) SUBSURFACE MEASUREMENT COMPRESSION AND RECONSTRUCTION

(71) Applicant: Halliburton Energy Services, Inc., Houston, TX (US)

(72) Inventors: Christopher Michael Jones, Katy, TX (US); Darren George Gascooke, Houston, TX (US); Anthony Herman Van Zuilekom, Houston, TX (US); Bin Dai, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 16/481,980

(22) PCT Filed: Nov. 6, 2018

(86) PCT No.: PCT/US2018/059349
§ 371 (c)(1),
(2) Date: Jul. 30, 2019

(87) PCT Pub. No.: WO2020/096570
PCT Pub. Date: May 14, 2020

(65) Prior Publication Data
US 2021/0032986 A1 Feb. 4, 2021

(51) Int. Cl.
*E21B 47/18* (2012.01)
*E21B 47/13* (2012.01)
(Continued)

(52) U.S. Cl.
CPC ............ *E21B 47/18* (2013.01); *E21B 47/13* (2020.05); *E21B 49/08* (2013.01); *G01V 3/30* (2013.01)

(58) Field of Classification Search
CPC ........ E21B 47/18; E21B 47/13; E21B 47/113; G01V 3/30; H03M 7/30; G06K 9/6244
See application file for complete search history.

(56) References Cited

U.S. PATENT DOCUMENTS

| 6,932,167 B2 | 8/2005 | Proett et al. |
| 7,680,600 B2 | 3/2010 | Carnegie et al. |

(Continued)

FOREIGN PATENT DOCUMENTS

| WO | 2018056976 A1 | 3/2018 |
| WO | 2020096571 A1 | 5/2020 |
| WO | 2020096572 A1 | 5/2020 |

OTHER PUBLICATIONS

PCT Application Serial No. PCT/US2018/059349, International Search Report, dated Jul. 29, 2019, 4 pages.
(Continued)

*Primary Examiner* — Regis J Betsch
*Assistant Examiner* — Kaleria Knox
(74) *Attorney, Agent, or Firm* — Gilliam IP PLLC (57) ABSTRACT

An apparatus includes a subsurface sensor in a borehole to provide a measurement series, a first processor, and a machine-readable medium having program code. The program code causes the apparatus to obtain the measurement series and generate a combination of functions based on the measurement series, wherein the combination of functions includes a subset of functions from a basis function library. The system also generate a set of values and communicates the set of values to a second processor, wherein the set of values includes a function identifier and corresponding function weight. The second processor is to generate a set of reconstructed measurement series based on the set of values and determine at least one of a formation property, a fluid property, and a well status based on the set of reconstructed measurement series.

20 Claims, 6 Drawing Sheets

(51) Int. Cl.
    *E21B 49/08*     (2006.01)
    *G01V 3/30*     (2006.01)

(56) References Cited

U.S. PATENT DOCUMENTS

| | | |
|---|---|---|
| 7,805,247 B2 | 9/2010 | Hsu et al. |
| 2003/0103563 A1 | 6/2003 | Amini et al. |
| 2006/0209963 A1 | 9/2006 | Valente |
| 2007/0198192 A1* | 8/2007 | Hsu .................. H03M 7/30 702/6 |
| 2012/0321209 A1 | 12/2012 | Le et al. |
| 2013/0135114 A1 | 5/2013 | Ringer et al. |
| 2014/0037199 A1 | 2/2014 | Aharon et al. |
| 2015/0078625 A1 | 3/2015 | Yu et al. |
| 2016/0012314 A1* | 1/2016 | Ramamurthy ....... G06K 9/6244 382/160 |
| 2017/0089195 A1* | 3/2017 | Yu .......................... E21B 47/18 |
| 2017/0114634 A1* | 4/2017 | Yu .......................... E21B 47/113 |
| 2018/0176499 A1 | 6/2018 | Gelman |

OTHER PUBLICATIONS

PCT Application Serial No. PCT/US2018/059349, International Written Opinion, dated Jul. 29, 2019, 4 pages.
PCT Application Serial No. PCT/US2018/059355, International Written Opinion, dated Aug. 6, 2019, 6 pages.
PCT Application Serial No. PCT/US2018/059360, International Search Report, dated Aug. 6, 2019, 3 pages.
PCT Application Serial No. PCT/US2018/059360, International Written Opinion, dated Aug. 6, 2019, 6 pages.
PCT Application Serial No. PCT/US2018/059355, International Search Report, dated Aug. 6, 2019, 3 pages.
Elad, et al., "K-SVD: An algorithm for designing overcomplete dictionaries for sparse representation", IEEE Transactions on Signal Processing, vol. 54, No. 11, pp. 4311-4322, Nov. 2006.

* cited by examiner

SUBSURFACE MEASUREMENT COMPRESSION AND RECONSTRUCTION

BACKGROUND

The disclosure generally relates to the field of subsurface characterization and more particularly to communication of subsurface measurement series.

Fluid properties and certain other physical properties of matter change depending on their environment. Certain formation tester tools have the ability to measure various physical properties below the surface of the Earth to provide a means of characterizing a formation and determine formation/fluid properties to account for this phenomenon. The formation tester tools can include a device to provide formation pumpout measurements, wherein a sample of formation fluid is isolated from its surroundings, produced at a certain testing flow rate to the surface, and measured within the borehole at its original environment. These in-situ measuring devices make measurements that would be inaccurate if the measurements were made at the surface.

Many operations use sophisticated subsurface sensors that generate a significant amount of data within a short time period. The measurements are often communicated to the surface using techniques such as fluid pulse telemetry, which limit the data bandwidth to a level far below the data acquisition rate of these subsurface sensors. Methods that optimize the data being transmitted to the surface are useful for formation evaluation and/or controlling a drilling operation, stimulation operation, or well production operation.

BRIEF DESCRIPTION OF THE DRAWINGS

Embodiments of the disclosure can be better understood by referencing the accompanying drawings.

DESCRIPTION OF EMBODIMENTS

The description that follows includes example systems, methods, techniques, and program flows that embody embodiments of the disclosure. However, it is understood that this disclosure can be practiced without these specific details. For instance, this disclosure refers to using results from a genetic algorithm method. Aspects of this disclosure can instead be applied to other nonlinear optimization methods such as a neural network method or a hybrid optimization method. In other instances, well-known instruction instances, protocols, structures and techniques have not been shown in detail in order to avoid obfuscating the description.

Various embodiments relate to a measurement communication system. A system can measure a borehole over time using one or more subsurface sensors inside of a borehole to produce an in-situ subsurface measurement series, wherein a measurement series is a set of measurements over a variable corresponding with the measurements such as time (e.g. a time series) or total volume of sample fluid extracted (e.g. a sample volume series). After obtaining the in-situ measurement series, a first processor located in the borehole can analyze the subsurface measurement series by comparing them to one or more sets of basis functions from a library of basis functions ("function library") and generating a combination of a subset of the basis functions from the function library ("combination of functions"). The system can use the first processor to fit the combination of functions to the measurement series using fit quality including one or more residual characteristics that are based on a difference(s) between the combination of functions and subsurface measurement series. In some embodiments, the system can access multiple function libraries and can select one of the function libraries based on the fit quality including residual characteristics.

The system can generate a set of characterizing values of the downhole data ("characterizing set") based on the combination of functions, the residual characteristics, and other values. The characterizing set can include characterizing values such as a function identifier indicating each function of the combination of functions, function parameters corresponding to each of the functions, and the function weight corresponding with each of the functions. In addition, the characterizing set can include other values such as residual characteristics, a paradigm which allows correct interpretation of transmitted values, etc. Once a transmission threshold is satisfied, the system can communicate the characterizing set to a second processor at a different location in the borehole away from the subsurface sensor or at the surface (e.g. a different location at least 20 feet away). The system can use the second processor to generate a reconstructed combination of functions based on the characterizing set. The system can then use the reconstructed combination of functions to generate one or more sets of reconstructed measurement series. The system can analyze the one or more sets of reconstructed measurement series to determine at least one of a formation property, fluid property, and well status.

By communicating characterizing values to the surface based on the measurement series instead of all of the measurement series, the system compresses the number of bits needed to communicate the measurement series. This compression can increase the accuracy and reliability of measurement communication over systems with limited bandwidth. For example, a system that is capable of transmitting 8-50 bits per second can be used to communicate characterizing values that accurately capture measurements collected at a rate of 10 megabytes per second. In addition, the characterizing values can be transmitted with multiple redundant signals to increase the reliability of the measurement and reduce the effect of noise on the measurements. Furthermore, the system can use the determined properties/statuses to modify a well testing operation such as reducing a testing flow rate of a sample fluid. Furthermore, the functions selected for fit and their contribution to the signal reconstruction provides a mechanism for process control including but not limited to drilling, completion and production operations and further formation tester sampling operations. For this purpose the method may be applied to wireline signal representation. Furthermore, the method may be applied to signal monitoring in low power or low bandwidth scenarios such as but not limited to remote monitoring such as remote pipeline monitoring or remote wellhead monitoring or remote subterranean permanent emplacement production monitoring within a petroleum well. These remote monitoring applications would use sensors similar to the sensors contained within the formation testing tool but affixed to the location without the aid of a formation testing tool. Furthermore, the method may be applied to signal processing for retrievable operations such as drill stem testing, well testing, well intervention such as coiled tubing operations. Furthermore, the method may be used for monitoring situations in which telemetry is high speed, but data collection is larger than telemetry rates. Such situations include but are not limited to acoustic monitoring, or fiber optic monitoring of wells.

Example Well Systems

Figure 1:
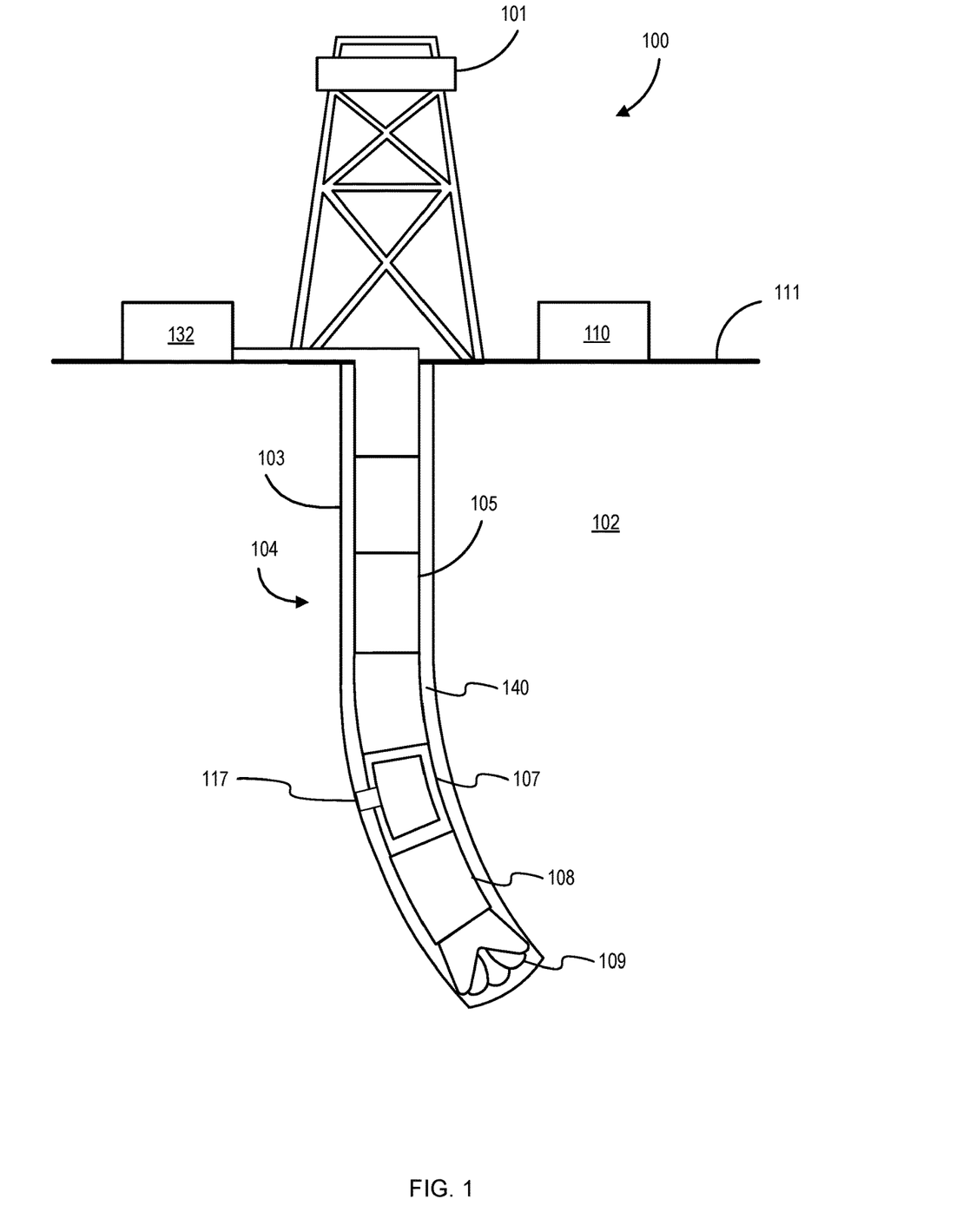
FIG. 1 is an elevation view of an onshore drilling system operating a downhole drilling assembly that includes a subsurface sensor system.

FIG. 1 is an elevation view of an onshore drilling system operating a downhole drilling assembly that includes a subsurface sensor system. A drilling system 100 includes a rig 101 located at a formation surface 111 and positioned above a borehole 103 within a subterranean formation 102. In some embodiments, a drilling assembly 104 can be coupled to the rig 101 using a drill string 105. In other embodiments, the drilling assembly 104 can be coupled to the rig 101 using a wireline or a slickline, for example. The drilling assembly 104 can include a bottom hole assembly (BHA). The BHA can include a drill bit 109, a steering assembly 108, and a logging-while-drilling (LWD)/measurement-while-drilling (MWD) apparatus having a formation tester tool 107. The formation tester tool 107 can include a fluid isolator 117 to isolate a fluid for measurement. The formation tester tool 107 can measure various properties (e.g. temperature, pressure, density, composition, contamination, bubble point, compressibility, viscosity, optical properties etc.) of the fluid in the fluid isolator 117, either while the fluid is not flowing or while the fluid is flowing at a testing flow rate through the fluid isolator 117. The formation tester tool 107 or another component of the BHA can also include a first processor to perform operations and generate results based on the measurements made by the formation tester tool 107.

During drilling operations, a mud pump 132 may pump drilling fluid (sometimes referred to as "drilling mud" or simply "mud") into the drill string 105 and down to the drill bit 109. The drilling fluid can flow out from the drill bit 109 and be returned to the formation surface 111 through an annular area 140 between the drill string 105 and the sides of the borehole 103. In some embodiments, the drilling fluid can be used to cool the drill bit 109, as well as to provide lubrication for the drill bit 109 during drilling operations. Additionally, the drilling fluid may be used to remove subterranean formation 102 cuttings created by operating the drill bit 109. Measurements or generated results can be transmitted to the formation surface 111 using mud pulses (or other physical fluid pulses) traveling through the drilling mud (or other fluid) in the borehole 103. These mud pulses can be measured at the formation surface 111 and communicated to a second processor in the control and analysis system 110 located at the formation surface 111.

Figure 2:
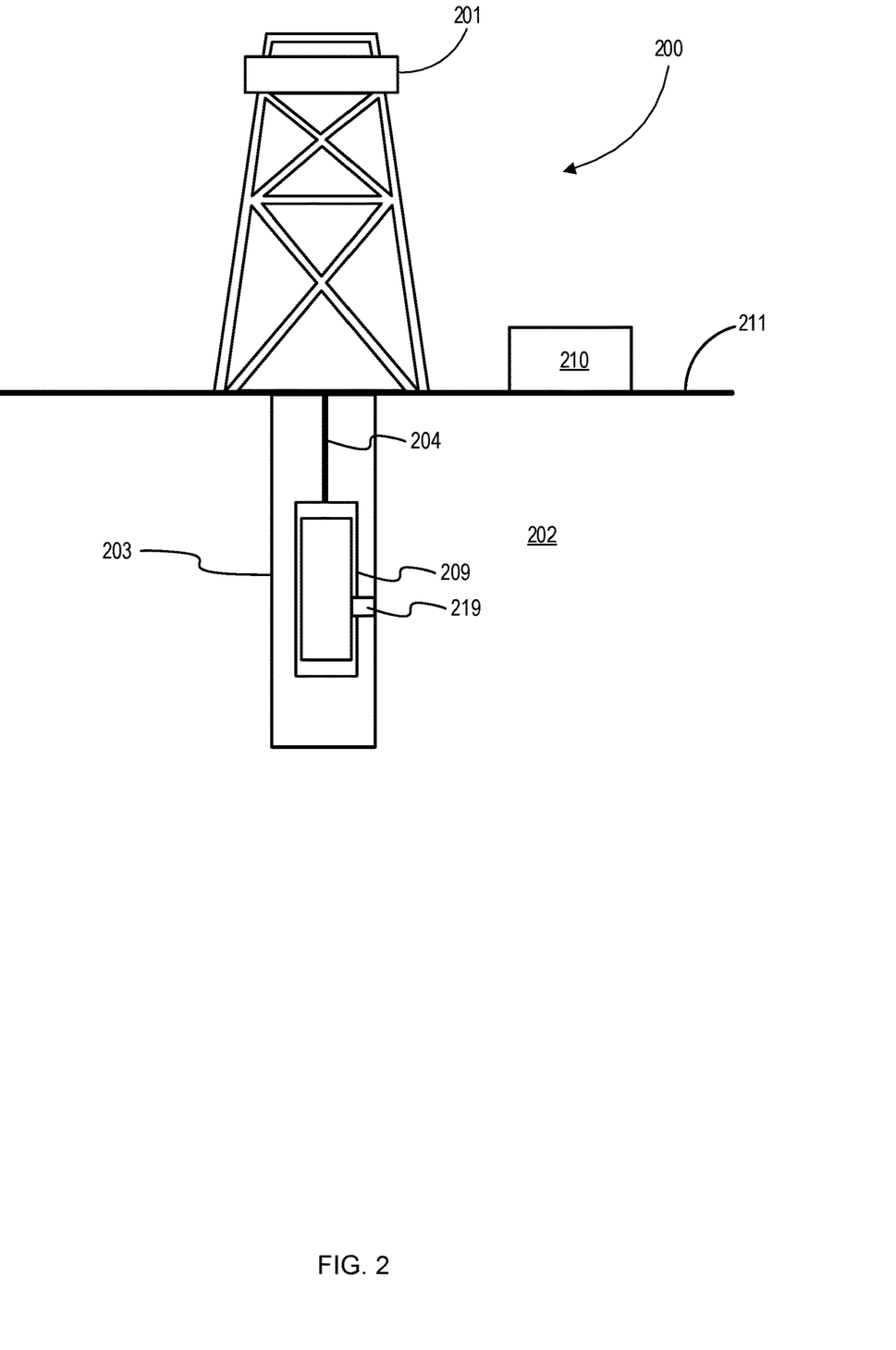
FIG. 2 is an elevation view of an onshore wireline system operating a wireline tool that includes a subsurface sensor system.

FIG. 2 is an elevation view of an onshore wireline system operating a wireline tool that includes a subsurface sensor system. A wireline system 200 includes a rig 201 located at a surface 211 and positioned above a wellbore 203 within a subterranean formation 202. The wireline system 200 can include a wireline 204 supporting a formation tester tool 209 that includes a fluid isolation chamber 219 and a first processor. The fluid isolation chamber 219 can extract and isolate a formation fluid sample from its immediate surroundings. The fluid in the fluid isolation chamber 219 can be tested by the formation tester tool 209 to provide various formation measurements about the wellbore 203 and the subterranean formation 202. A control and analysis system 210 located at the surface 211 can include a second processor and memory device and can communicate with elements of the formation tester tool 209.

During well testing operations, the wireline 204 can transmit characterizing values generated by the first processor in the formation tester tool 209 to the surface 211 via the wireline 204. In some embodiments, the results provided from the operations disclosed below can be transmitted via the wireline 204. Alternatively, the results can be communicated via fluid pulses traveling through fluids in the wellbore 203 or electromagnetic signals to the surface 211. Once at the surface 211, the characterizing values can be communicated to the second processor in the control and analysis system 210.

Example Flowcharts

Figure 3:
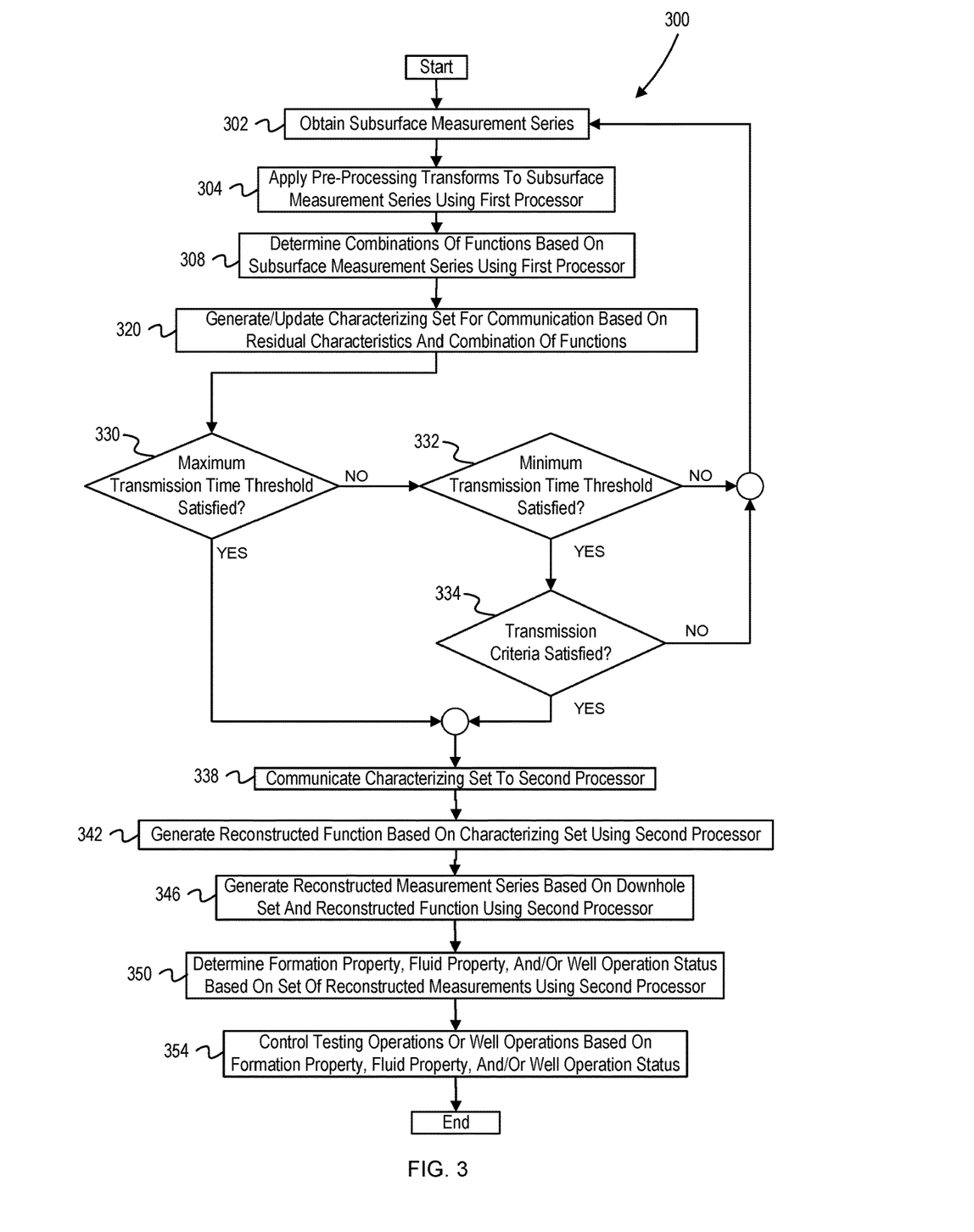
FIG. 3 depicts a flowchart of operations to communicate a subsurface measurement series.

FIG. 3 depicts a flowchart of operations to communicate a subsurface measurement series. FIG. 3 depicts a flowchart 300 of operations that are described with reference to a system comprising a first processor and a second processor. Operations of the flowchart 300 start at block 302.

At block 302, the system obtains a subsurface measurement series. The subsurface measurement series can be obtained from a set of subsurface sensors such as a set of subsurface fluid property sensors. For example, the subsurface measurement series can include fluid pumpout measurements such as fluid density measurements, temperature measurements, and pressure measurements. Other example measurements can include measurements for a bubble point, compressibility, capacitance, resistivity, viscosity, optical properties, other chemical properties, and other physical properties. In some embodiments, the subsurface measurement series can be a time series of the subsurface measurement series. For example, fluid pumpout measurements obtained by the system can be stored as a time series. As the system obtains a subsurface measurement series, it can update a combination of functions based on the subsurface measurement.

The system can control various calibration actions or testing operations while obtaining the subsurface measurement series to increase measurement accuracy and reduce the effect of contaminants such as drilling mud on the subsurface measurement series. In some embodiments, the system can allow fluid sample flow to occur for a calibration period or a calibration volume before obtaining the subsurface measurement series. For example, with reference to FIG. 1, the system can allow isolated fluids to flow through the formation tester tool 107 until a calibration period (e.g. 1-100 hours) is reached or until a calibration volume has flowed from the formation through the formation tester tool 107 (e.g. 50-1000 liters). In addition, the system can set the testing flow rate of the fluid sample during this calibration period or during a measurement period to a specific flow rate. As described further below for block 354, based on one or more determined formation properties, fluid properties and/or well statuses, the system can control a testing operation and obtain the subsurface measurement series again after altering the testing operation.

At block 304, the system applies transforms to the subsurface measurement series using the first processor. The system can apply transforms to reduce noise, increase accuracy, and increase the efficiency of later operations. In some embodiments, the system can apply transformations such as Fast Fourier transformations, wavelet transformations, and normalization transformations. For example, the system can apply a wavelet transformation to the subsurface measurement series to compress the subsurface measurement series, increasing the communication efficiency of later communication operations. Other example transforms include principal component analysis, exponential fitting, etc. Transforms may be applied either to univariate signals or multivariate signals from one or more sensors.

At block 308, the system determines a selected combination of functions based on the subsurface measurement series using the first processor. The system can determine a selected combination of functions by selecting a combination of functions from a set of combinations. The system can select the combination of functions by determining one or more residual characteristics as described below and then applying a set of criteria based on the one or more residual characteristics.

The system can use various methods to generate a set of combinations and select a combination of functions from the set of combinations. The combination of functions can be a linear combination of basis functions from a function library. As an example, the combination of functions F can be represented by Equation 1, wherein each function $f_i$ is the i-th function in the combination of functions, N is the total number of basis functions in the combination of functions, and $w_i$ is a corresponding function weight for $f_i$:

$$F=\Sigma_{i=1}^{N} w_i f_i \qquad (1)$$

In Equation 1, a functional form $f_i$ may be used more than once. Other examples of the combination of functions include multiplicative functions (e.g. $w_1 * f_1 * f_2$), imbedded functions $f_1(f_2)$, or logical functions (e.g. $f_1$ from a to b or $f_2$ from b to c). While the examples given above use two functions to denote the relationships, sets of functions may be very large (e.g. hundreds or thousands of functions). A paradigm can be used to improve the accuracy of a representation of a signal by a combination of functions while reducing the overall number of functions used in the combination of functions. While the system can systematically generate every possible combination of functions from a function library and select for a least residual characteristic, the system can also use more efficient optimization methods. In some embodiments, the system can determine the combinations of functions of a function library or even select a function library from a set of function libraries using machine-learning methods. The system can generate combinations of functions or select a library using various nonlinear optimization methods such as a genetic algorithm (GA) method, a neural network method, or a hybrid algorithm method, wherein the hybrid algorithm can be based on a GA method and artificial neural network (ANN) method. For example, the system can use a GA method to select a combination of functions, using one or more of the residual characteristics described below as a cost function.

Residual characteristics can be calculated based on a comparison between one or more of the subsurface measurement series and one or more values from a combination of functions. The residual characteristics can include values such as a lack of fit (LOF), noise in the dataset, one or more other model errors (e.g. mean square error, etc.). For example, a residual characteristic value of mean square error can be determined by taking a taking the mean of the squares of the difference between the combination of functions shown in Equation 1 and the subsurface measurement series.

In some embodiments, the system can select which function library to use from a set of function libraries. In the case where there is only one particular function library available to the system, the system can select that particular function library by default. Otherwise, the system can determine which function library to use based on one or more residual characteristics corresponding with that library. For example, the system can select a function library to use from a set of available function libraries by selecting a first function library by default and selecting a second library if a residual characteristic corresponding to the combination of functions generated from the first library is greater than a library threshold (e.g. a LOF library threshold). Alternatively, the system can select a function library to use based on which library can be used to generate a combination of functions having a least residual characteristic value (e.g. select a combination of functions and corresponding library based on least LOF).

As another alternative, the system can select a function library based on predetermined instructions corresponding with a formation property, fluid property, or well status. For example, the system can determine that the subsurface measurement series are indicative of a categorical fluid property of "gas breakout" and, in response, select a first function library from a set of two libraries based on the first function library being designated for "gas breakout" operations. As another example, the system can determine that the subsurface measurement series indicate the categorical fluid property of "multi-phase" and, in response, select a first function library from a set of two libraries based on the first library being designated for "multi-phase" operations and the second library being designated for "single-phase" operations.

In some embodiments, each function in the function library can be mutually orthogonal. Alternatively, some of functions in the function library can be non-orthogonal to each other. The function library can include various number of basis functions. For example, the function library can have a total of 100 basis functions, 1000 basis functions, 2048 basis functions, $10^7$ basis functions, any number of basis functions in between the stated number of basis functions, etc. Furthermore, multiple libraries in a set of available function libraries can share one or more basis functions. Selection of an optimal function library can be determined by the cost of transmission bits (higher for larger function libraries) and/or the representation capability of the function set (better accuracy for larger function libraries). A desired bit rate can be selected with a functional library (or set of libraries) selected based on being able to provide a bit rate that is less than or equal to the desired bit rate, a desired representation accuracy can be selected with the desired function library selected to at least meet a desired accuracy threshold, or a combination therein. The bit rate can depend on the size of the function library, the composite number of function parameters for the functions of the function library, and the number of functions used to represent a signal. In some embodiments, the number of bits required to reconstruct a signal increase with increasing size of the function parameters used to perform the reconstruction, which can decrease the compression ratio.

In some embodiments, the residual characteristics can include classifications of other residual characteristics. For example, the system can compare the system noise to a model and classify the system noise using various classification methods, such as via a classifier tree. Classifications can indicate that error values are decreasing over time, increasing over time, heterostatic, homostatic, sinusoidal, etc. Alternatively, or in addition, the classifications of other residual characteristics can include an error-tracking function. For example, the system can generate an error-tracking function for the LOF in the form of a sinusoidal wave, increasing function, or other function as a classification of a residual characteristic.

The system can use various criteria when determining the selected combination of functions. For example, in addition to machine-learning methods described above, the system can select a combination of functions based on the combination of functions having the lowest average residual characteristics value amongst all generated combinations of functions that includes fewer than a maximum number of basis function (e.g. 13 basis functions). A system can select one or more subset libraries from a function library in order to reduce the bit rate for desired cases. One method for selecting a subset library can be to order the function library into a set of ordered functions. In some embodiments, the ordered functions can be ordered from the most frequently used functions to the least frequently used functions. Alternatively, the ordered functions can be ordered by a related criteria of most influential functions to least influential functions. The system can decrease the size of the library to a subset library of a desired size in special circumstances based on a sequential list of the ordered functions. Influence can be determined by a functions frequency of use and/or magnitude of contribution. An example of a special circumstance is if the bit rate of the telemetry system decreases, which can induce to system to use a smaller library (e.g. by using a subset library of a function library). Another example of a special circumstance can be if sensor parameters or tool parameters are operating within a specified range. For example, the system can use a subset library A if the pump rate is operating fast, use a subset library B if a pump rate is operating slowly, use a subset library C if the density sensor is vibrating between two predetermined frequencies, or use a subset library D if the density sensor is operating between two different predetermined frequencies. In addition to sensor parameters and tool parameters, environmental conditions such as but not limited to temperature and pressure may also be used to select library subsets. The resolution of function parameters for functional weights may also be used to adjust the bit rate based on situations including but not limited to the situational examples given above. Further, the number of functions used by the system may also be changed based on changes in a system's situation, including but not limited to the situational examples given above. Alternatively, the system can determine a selected combination of functions based on which combination of functions includes the fewest basis functions amongst the set of combinations that satisfies one or more residual characteristic thresholds. For example, the system can select a combination of functions based on which of the combination of functions includes the fewest basis functions amongst an example subset, wherein each combination in the example subset correspond with a residual characteristic (e.g. LOF, model error, etc.) that is less than an example maximum residual characteristic threshold (e.g. 5%). In addition, the system can apply additional criteria when determining the selected combination of functions. For example, the system can determine a first set of combinations using the fewest number of basis functions that satisfy one or more residual characteristic thresholds and then determine the selected combination of functions by selecting the combination of functions having a least residual characteristic value amongst the first set of combinations (e.g. a least LOF error, a least variance, etc.).

At block 320, the system can generate and/or update a characterizing set for communication based on the residual characteristics and combination of functions using the first processor. The system can generate the characterizing set if no existing characterizing set is stored in the system memory or update the characterizing set otherwise. The characterizing set includes various values usable to generate reconstructed measurement series based on a selected combination of functions and the selected combination's corresponding residual characteristics. In some embodiments, the characterizing set can include a function identifier indicating each of the functions used in the combination of functions, the corresponding function weights of each of the functions, the parameters for each of functions, one or more residual characteristics, and/or a paradigm to help accurately interpret the characterizing set.

For example, the system can generate a characterizing set that includes function identifiers "['1d5', '4p6'],", their corresponding function weights "[0.85, 0.15]," and their corresponding parameters "[4.5, 39.1152, 3.0, 2.5]." As will be described further below for block 342, the system can use these characterizing values to generate a reconstructed combination of functions that includes the basis function identified by the identifier "1d5." If the identifier "1d5" identifies a function represented by Equation 2 where "m" and "b" are function parameters, and the identifier "4p6" identifies a function represented by Equation 3 where "c" and "d" are function parameters, the reconstructed combination of functions can be represented in form of Equation 4, wherein the individual basis functions and their corresponding parameters are shown in Equations 5 and 6:

$$y = m \cdot x + b \quad (2)$$

$$y = c^{-x} + d \quad (3)$$

$$F = 0.85 * f_1(x) + 0.15 * f_2(x) \quad (4)$$

$$f_1 = 4.5 \cdot x + 39.1152 \quad (5)$$

$$f_2 = 3.0 \cdot x + 2.5 \quad (6)$$

Functions may also be continuous or discontinuous vector sets such as but not limited to Eigen vectors destined to a dataset by methods such as but not limited to principal component analysis or singular value decomposition. As described above, the characterizing set can also include the residual characteristics. For example, the characterizing set can include one or more LOF values, noise values, and/or model error values, and/or a classifier indicating a status such as "gas breakout", "asphaltene precipitation", "emulsion." In some embodiments, the system can transmit a classifier in place of a plurality of quantitative residual characteristic values. In some embodiments, the system can increase the reliability and efficiency of subsurface communication by reducing the number of communicated characterizing values, wherein the reduction occurs from simplifying multiple other residual characteristics into a classifier.

In addition to including function parameters and residual characteristics into a characterizing set, the system can determine a paradigm based on a selected combination of functions and include the paradigm into the characterizing set. The paradigm can include one or more paradigm parameters, each of which can be used to help interpret the characterizing set. For example, the paradigm parameters can include a set of values which represent the number of bits assigned to one or more values in the characterizing set, a delimiter sequence used to separate values, a library-indicating identifier, etc.

At block 330, the system determines whether a maximum transmission time threshold is satisfied. The system can determine that the maximum transmission time threshold is satisfied if the elapsed time since a previous transmission of a characterizing set is greater than the maximum time threshold. For example, if the maximum transmission time threshold is 20 minutes and the elapsed time since a previous transmission of a downhole is greater than 20 minutes, the system can determine that the maximum transmission time threshold is satisfied. If the system determines that the maximum transmission time threshold is satisfied, the system can proceed to operations described for block 338. Otherwise, the system can proceed to operations described for block 332.

At block 332, the system determines whether a minimum transmission time threshold is satisfied. The system can determine that the minimum transmission time threshold is satisfied if the elapsed time since a previous transmission of a characterizing set is greater than the minimum time threshold. For example, if the minimum transmission time threshold is 5 minutes and the elapsed time since a previous transmission of a downhole is greater than 5 minutes, the system can determine that the minimum transmission time threshold is satisfied. If the system determines that the minimum transmission time threshold is satisfied, the system can proceed to operations described for block 334. Otherwise, the system can return to operations described for block 302 to continue obtaining surface measurements.

At block 334, the system determines if one or more transmission criteria are satisfied. The one or more transmission criteria can be satisfied in various cases, such as when a paradigm is changed, when the functions in a selected combination of functions are different from the functions in a previously selected combination of functions, when the LOF increases above a fitting threshold, when the model error is greater than model error threshold, etc. If the system determines that the one or more transmission criteria are satisfied, the system can proceed to operations described for block 338. Otherwise, the system can return to operations described for block 302 to continue obtaining surface measurements.

At block 338, the system transmits the characterizing set. In some embodiments, the system transmits the characterizing set by sending signals via sets of fluid pulses. For example, with reference to FIG. 1, the system can transmit the characterizing set from the formation tester tool 107 to the surface via fluid pulse telemetry at a bit rate of 20 bits per second (though other bit rates such as 10 bits per second or 200 bits per second are possible). Alternatively, the system can communicate the characterizing set through a wireline communication system or electromagnetic communication system. During transmission of the characterizing set, different values in the characterizing set can be communicated using different numbers of bits. For example, a library identifier can be communicated using 10 bits, a first function parameter can be communicated using 12 bits, and a second function parameter can be communicated using 8 bits.

At block 342, the system generates a reconstructed combination of functions based on the characterizing set. The system can generate the reconstructed combination of functions by selecting basis functions indicated by the function identifiers of the characterizing set and substituting in the corresponding parameters from the transmitted characterizing set. For example, with reference to the description for block 324 above, the system can reconstruct the function shown in Equations 4-6 based on the library-indicating identifier ['A'], function-indicating identifiers "['1d5', '4p6']," their corresponding function weights of 0.85 and 0.15, and their corresponding parameters "[4.5, 39.1152, 3.0, 2.5]".

At block 346, the system can generate a set of reconstructed measurement series based on the reconstructed combination of functions and other values from the characterizing set. The system can generate the set of reconstructed measurement series by first determining values using the reconstructed combination of functions and then adding randomization to the values by using the residual characteristics as parameters in a random function. In some embodiments, the system can use a Monte Carlo method to reconstruct the set of random values, wherein the residual characteristics described for block 308 can be used to determine parameters used by the Monte Carlo method. For example, the system can use residual characteristics as Monte Carlo parameters to determine confidence bands and error tolerances for each of the simulated measurement times in the set of reconstructed measurement series when generating the set of reconstructed measurement series. This method can be particularly useful because of the complicated paradigm nature that functions may be combined.

At block 350, the system can determine a formation property, fluid property, and/or well status based on the reconstructed measurement series. In some embodiments, the system can determine a particular formation or fluid property directly from measurements of that particular formation or fluid property. For example, the system can determine a fluid density over a measured period of time by determining the average density of a set of reconstructed measurement series of density. In some embodiments, the system can also determine at least one of a formation property, fluid property, and well status based on the functions of the combination of functions, their corresponding function weights, and/or classifications transmitted in the characterizing set.

In some embodiments, the system can determine the formation property and/or fluid property by applying fitting methods to generate curves for the reconstructed measurement series. The system can compare these curves, values predicted by the curves, integrals of these curves, and/or the derivatives of these curves to a library of known behaviors to determine the formation property, fluid property, or well status. In addition, the system can determine whether one or more physical phenomena are occurring and associate an indicator of the one or more physical phenomena. For example, the system can determine that a testing operation is fractionating reservoir fluid based on a reconstructed measurement showing a reduced pressure relative to a total volume of fluid collected. Alternatively, or in addition, the system can compare the curves to a library of known behaviors to determine whether other phenomenon or compositions are present, such as asphaltene precipitation, gas drop-out, emulsion, etc. In some embodiments, the system can directly analyze the curves to determine formation or fluid property. For example, the system can independently determine a dew point without referencing a library of known behaviors by determining where generated curves show an intersection at a particular state.

In some embodiments, the system can determine a well status based on the reconstructed measurement series. A well status is a quantitative or categorical value that reflects at least one parameter of well operations (e.g. drilling status, drilling speed, production flow rate, whether or not any components are damaged in the well, etc.) The system can determine a well status by analyzing the reconstructed measurement series to generate a status indicator. For example, the system can compare the curve to a library of known behaviors to determine that mud particulates are present in a sample of formation fluid. In some embodiments, the system can also compare the curves to a library of known behaviors to determine that non-formation effects are interfering with well testing operations. For example, the system can determine that a reconstructed measurement has a fluid density and electric resistivity associated with a particular non-formation fluid contamination percentage ("contamination level"), and that the particular contamination level exceeds a contamination threshold. Based on the contamination level exceeding the contamination threshold, the system can generate a status indicator to indicate that non-formation effects are interfering with well-testing operations. In response, the system can generate a status indicator that indicates that a pad in the borehole is leaking. Furthermore, the system can generate various other status operations, each of which can indicate one or multiple well statuses.

At block 354, the system can control testing operations or well operations based on the formation property, fluid property, and/or well status. In some embodiments, controlling testing operations can include sending instructions to a formation tester tool to reduce a testing flow rate, increase a calibration time, change a testing time, modify a testing pressure, and/or change the formation tester tool measurement depth before testing fluid properties again at the changed measurement depth. For example, the system can determine that the testing operation is fractionating reservoir fluid or inducing asphaltene precipitation and, in response, reduce a testing flow rate. Alternatively, or in addition, the system can determine that the contamination level exceeds a contamination threshold and increase a calibration period in response. As another example, the system can determine that a testing flow rate is insufficient or that the reconstructed measurement series are not indicative of any hydrocarbon presence and, in response, send instructions to modify a formation tester tool depth before obtaining more subsurface measurements. Furthermore, the system can control testing operations or well operations by providing indicators of the formation property, fluid property, and/or well status to an artificial intelligence control system. For example, the system can provide the indicators of the well status to a feed-forward artificial intelligence system to control a drilling direction. In some embodiments, the system can determine a formation architecture (which can be a formation property) based on which functions are selected from the function library for signal reconstructions. For example, if similar functions are selected for pumpout signal reconstruction with similar function weights and similar function parameters, the system can determine that the fluid from those two different zones are in production communication and are from continuous reservoir sections. Likewise, the system can determine that regular and monotonically changing function parameters is indicative of fluid compositional grading within a reservoir. Function parameters representing formation signal reconstruction themselves may be indicative of formation types or classifications. Function parameters representing fluid signal reconstruction themselves may be indicative of fluid types or classifications.

The flowcharts above are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 3, applying pre-processing as disclosed in block 304 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Example Data

Figure 4:
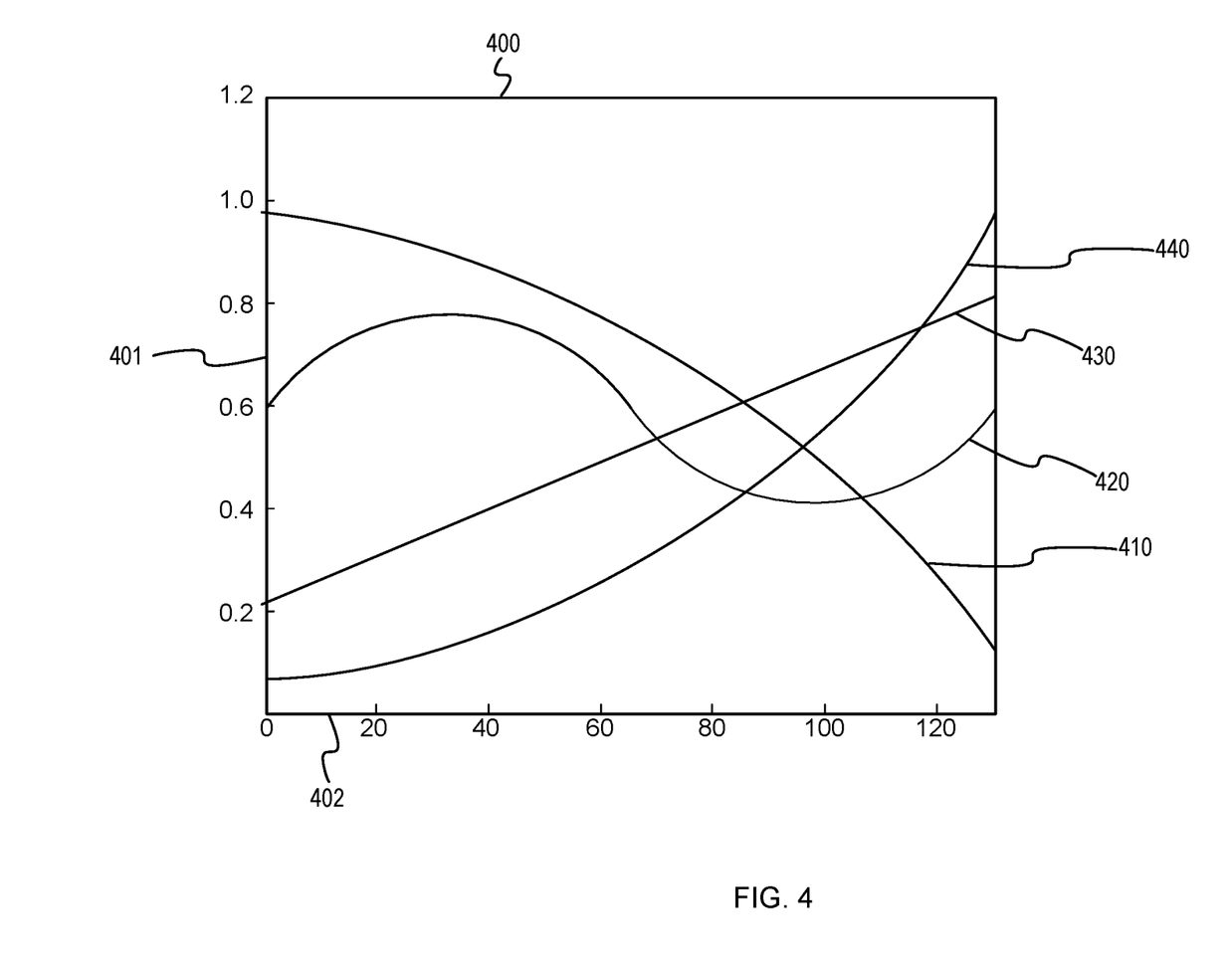
FIG. 4 depicts an example set of functions that can be included in a function library.

FIG. 4 depicts an example set of functions that can be included in a function library. The plot 400 has a vertical axis 401 and a horizontal axis 402. The vertical axis 401 corresponds with a normalized signal value and the horizontal axis 402 corresponds with a normalized time value. The plot 400 includes a first basis function 410, second basis function 420, third basis function 430, and fourth basis function 440. Each of the four basis functions can be modified based on one or more function parameters. A system can use a function library including the basis functions 410, 420, 430 and 440 to generate a combination of functions. In addition, the function library can include various other functions. For example, the function library can include sinusoidal functions, directly proportional functions, functions with an offset, exponential functions, exponentially decaying functions, arctan functions, etc.

Figure 5:
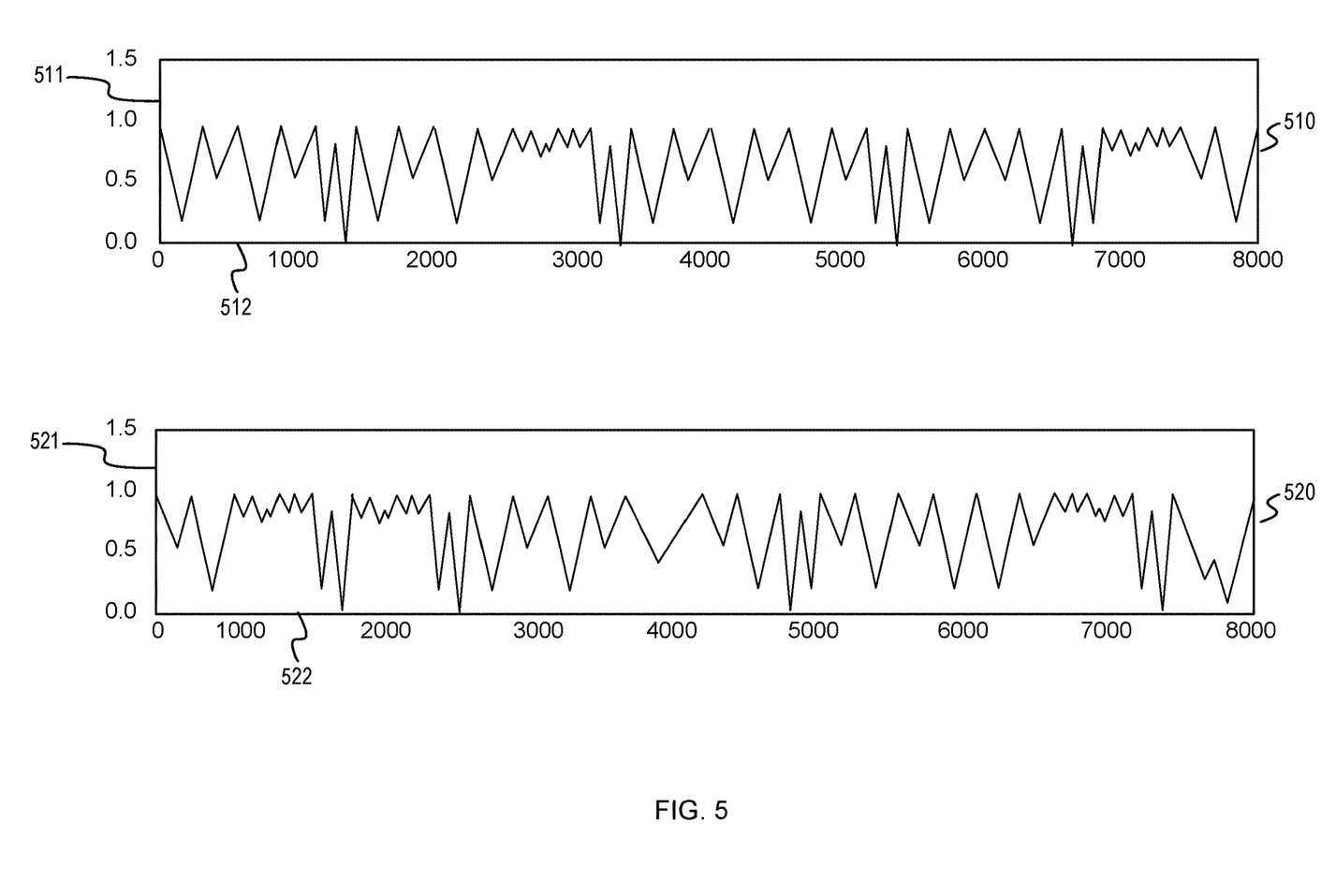
FIG. 5 depicts an example subsurface measurement series and a reconstructed measurement series.

FIG. 5 depicts an example subsurface measurement series and a reconstructed measurement series. An idealized density time series plot 510 represents an example subsurface measurement series from a subsurface sensor over time. The vertical axis 511 of the idealized density time series plot 510 represents normalized density values. The horizontal axis 512 of the idealized density time series plot 510 represents times of measurement. With reference to FIG. 3 above, a system can obtain the measurements represented by the idealized density time series plot 510 to generate a combination of functions and a characterizing set using the operations described for blocks 308 and 320.

The system can then communicate the characterizing set based on the subsurface measurement series and the combination of functions to a second processor via fluid pulse telemetry. The second processor can generate a reconstructed combination of functions based on the communicated characterizing set to generate reconstructed measurement series represented by a reconstructed density time series plot 520. The vertical axis 521 of a reconstructed density time series plot 520 represents simulated normalized density values. The horizontal axis 522 of the reconstructed density time series plot 520 represents simulated times of measurement. Using the data of the reconstructed density time series plot 520, the system can determine various fluid properties such as an average fluid density, fluid composition, etc.

Example Computer Device

Figure 6:
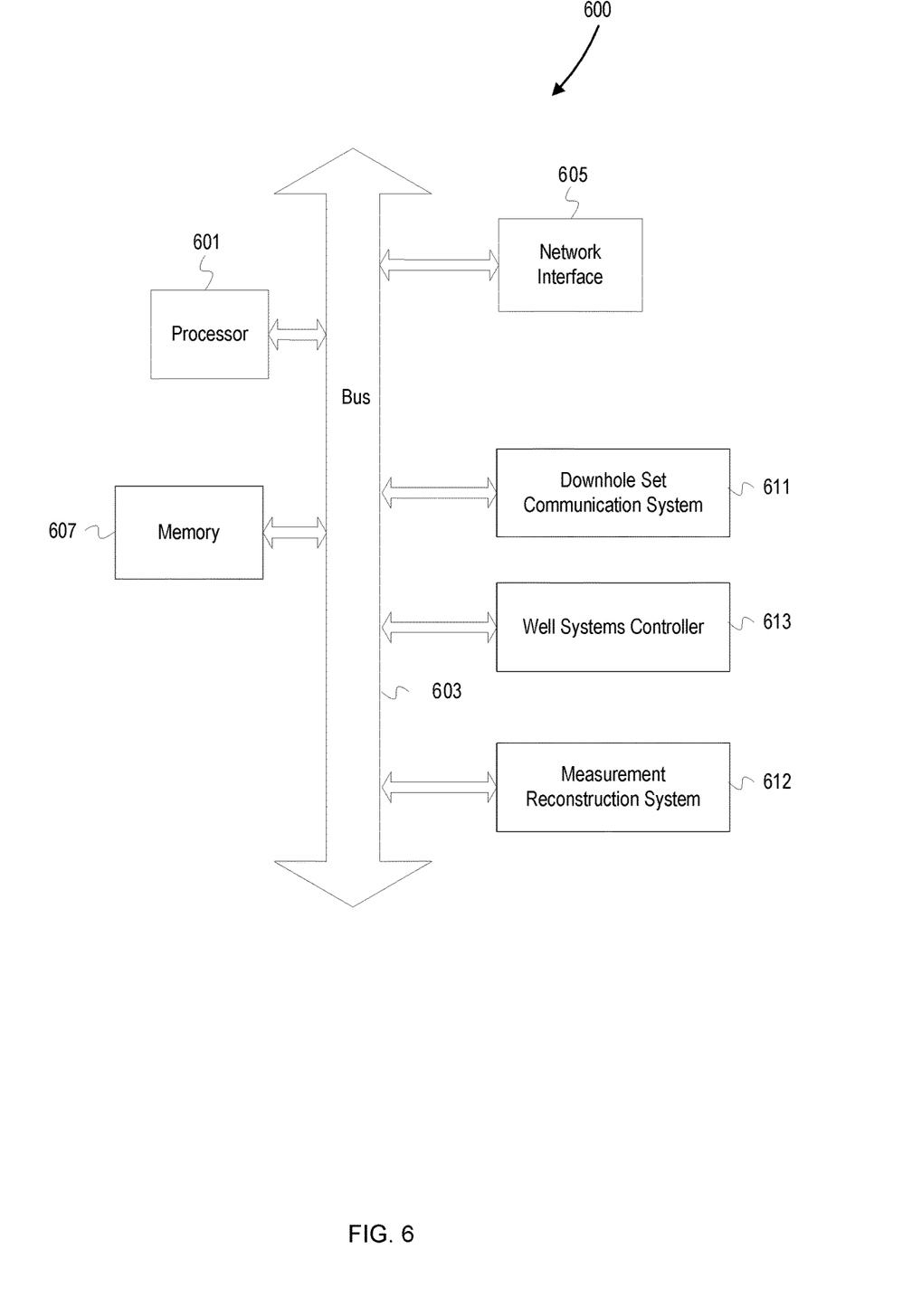
FIG. 6 depicts an example computer device.

FIG. 6 depicts an example computer device. A computer device 600 includes a processor 601 (possibly including multiple processors, multiple cores, multiple nodes, and/or implementing multi-threading, etc.). The computer device 600 includes a memory 607. The memory 607 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 600 also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.).

In some embodiments, the computer device 600 includes a characterizing set communication system 611, property determination system 612, and well system controller 613.

The characterizing set communication system 611 can perform one or more operations for communicating a characterizing set, including generating a combination of functions, determining residual characteristics and/or determining paradigm parameters. The property determination system 612 can perform one or more operations for determining a formation/fluid property or well status, including reconstructing a combination of functions, reconstructing measurements, and/or determining formation/fluid parameters. A well system controller 613 can also perform one or more operations for controlling a drilling system, well treatment system, or wireline system. For example, the well system controller 613 can modify the direction of drill bit, modify the speed of a wireline tool being lowered into a borehole, or change the pump rate of a fluid into a borehole. Any one of the previously described functionalities can be partially (or entirely) implemented in hardware and/or on the processor 601. For example, the functionality can be implemented with an application specific integrated circuit, in logic implemented in the processor 601, in a co-processor on a peripheral device or card, etc. Further, realizations can include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 can be coupled to the processor 601. The computer device 600 can be integrated into component(s) of the drill pipe downhole and/or be a separate device at the surface that is communicatively coupled to the BHA downhole for controlling and processing signals (as described herein). The computer device 600 can duplicated and positioned at separate positions a borehole. Alternatively, the computer device 600 can duplicated and positioned at both a position in a borehole and at the surface of the borehole. In some embodiments, a first computer device similar to the computer device 600 can be positioned in the borehole without the property determination system 612 and a second computer device similar to the computer device 600 can be positioned in a different location from the first computer device without the characterizing set communication system 611.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electro-magnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Use of the term "set" can be treated as meaning "group having least one of" For example, "set of items" can be treated as meaning "group of items having at least one item." A formation property is a measurable property of the formation such as formation density, amount of hydrocarbons in the formation, formation porosity, formation permeability, etc. A fluid property is a measurable property of a fluid such as fluid pressure, fluid temperature, fluid composition, fluid concentration, etc.

EXAMPLE EMBODIMENTS

Example embodiments can include the following:
Embodiment 1: An apparatus comprising: a subsurface sensor for use in a borehole to provide a measurement series;

a first processor to receive the measurement series; and a machine-readable medium having program code to cause the apparatus to, obtain the measurement series, generate a combination of functions based on the measurement series using the first processor, wherein the combination of functions comprises a subset of functions from a library of basis functions, generate a set of values, wherein the set of values comprises a function identifier and corresponding function weight for at least one function from the combination of functions, communicate the set of values to a second processor at a different location from the first processor, the second processor to generate a set of reconstructed measurement series based on the set of values and determine at least one of a formation property, a fluid property, and a well status based on the set of reconstructed measurement series.

Embodiment 2: The apparatus of Embodiment 1, wherein the program code to communicate the set of values to the second processor comprises program code to: determine whether the functions in the combination of functions are different from previous functions in a previous selected combination of functions; and communicate the set of values based on a determination that the functions in the combination of functions are different from previous functions in the previous selected combination of functions.

Embodiment 3: The apparatus of any of Embodiments 1-2, wherein the program code to communicate the set of values to the second processor comprises program code to cause the apparatus to transmit the set of values through fluid telemetry, wherein the fluid telemetry comprises transmission of physical pulses through a fluid in the borehole.

Embodiment 4: The apparatus of any of Embodiments 1-3, wherein a first value of the set of values is communicated using a first number of bits, and wherein a second value of the set of values is communicated using a second number of bits that is different from the first number of bits.

Embodiment 5: The apparatus of any of Embodiments 1-4, further comprising program code executable by the second processor to: generate a reconstructed combination of functions based on the set of values; and generate the set of reconstructed measurement series based on the reconstructed combination of functions.

Embodiment 6: The apparatus of any of Embodiments 1-5, further comprising program code to reduce a testing flow rate of a sample fluid being measured by the subsurface sensor based on at least one of the formation property, the fluid property, and the well status.

Embodiment 7: The apparatus of any of Embodiments 1-6, wherein the combination of functions is a first combination of functions, and wherein the program code to determine the first combination of functions comprises program code to: determine a residual characteristic based on the first combination of functions and the measurement series using a difference between a measurement in the measurement series corresponding with a time point and a predicted value of the combination of functions at a same time point; and select the first combination of functions from a set of combinations based on the residual characteristic.

Embodiment 8: The apparatus of any of Embodiments 1-7, wherein the library of basis functions is a first library of basis functions, further comprising program code to select the first library of basis functions from a plurality of libraries of basis functions based on the residual characteristic being less than at least one of a residual characteristics threshold and a second residual characteristic, wherein the second residual characteristic is determined based on a second combination of functions generated using a second library of basis functions.

Embodiment 9: One or more non-transitory machine-readable storage media comprising program code for determining at least one of a formation property, a fluid property, and a well status, the program code to: obtain a measurement series using a subsurface sensor in a borehole; generate a combination of functions based on the measurement series using a first processor in the borehole, wherein the combination of functions comprises a subset of functions from a library of basis functions; generate a set of values, wherein the set of values comprises a function identifier and corresponding function weight for at least one function from the combination of functions; communicate the set of values to a second processor at a different location from the first processor; generate a set of reconstructed measurement series based on the set of values; and determine at least one of the formation property, the fluid property, and the well status based on the set of reconstructed measurement series.

Embodiment 10: The one or more non-transitory machine-readable storage media of Embodiment 9, wherein the program code to communicate the set of values to the second processor comprises program code to: determine whether the functions in the combination of functions are different from previous functions in a previous selected combination of functions; and communicate the set of values based on a determination that the functions in the combination of functions are different from previous functions in the previous selected combination of functions.

Embodiment 11: The one or more non-transitory machine-readable storage media of any of Embodiments 9-10, wherein the program code to communicate the set of values to the second processor comprises program code to transmit the set of values through fluid telemetry, wherein the fluid telemetry comprises transmission of physical pulses through a fluid in the borehole.

Embodiment 12: The one or more non-transitory machine-readable storage media of any of Embodiments 9-11, wherein a first value of the set of values is communicated using a first number of bits, and wherein a second value of the set of values is communicated using a second number of bits that is different from the first number of bits.

Embodiment 13: The one or more non-transitory machine-readable storage media of any of Embodiments 9-12, further comprising program code to reduce a testing flow rate of a sample fluid being measured by the subsurface sensor based on at least one of the formation property, the fluid property, and the well status.

Embodiment 14: A method for determining at least one of a formation property, a fluid property, and a well status, the method comprising: obtaining a measurement series using a subsurface sensor in a borehole; generating a combination of functions based on the measurement series, wherein the combination of functions comprises a subset of functions from a library of basis functions; generating a set of values, wherein the set of values comprises a function identifier and corresponding function weight for at least one function from the combination of functions; communicating the set of values to a reconstruction processor at a different location from the subsurface sensor; generating a set of reconstructed measurement series based on the set of values; and determining at least one of the formation property, the fluid property, and the well status based on the set of reconstructed measurement series.

Embodiment 15: The method of Embodiment 14, wherein communicating the set of values to the reconstruction processor comprises: determining whether the functions in the combination of functions are different from previous functions in a previous selected combination of functions; and communicating the set of values based on a determination that the functions in the combination of functions are different from previous functions in the previous selected combination of functions.

Embodiment 16: The method of any of Embodiments 14-15, wherein communicating the set of values to the reconstruction processor comprises transmitting the set of values through fluid telemetry, wherein the fluid telemetry comprises transmission of physical pulses through a fluid in the borehole.

Embodiment 17: The method of any of Embodiments 14-16, wherein a first value of the set of values is communicated using a first number of bits, and wherein a second value of the set of values is communicated using a second number of bits that is different from the first number of bits.

Embodiment 18: The method of any of Embodiments 14-17, further comprising: generating a reconstructed combination of functions based on the set of values; and generating the set of reconstructed measurement series based on the reconstructed combination of functions.

Embodiment 19: The method of any of Embodiments 14-18, further comprising reducing a testing flow rate of a sample fluid being measured by the subsurface sensor based on at least one of the formation property, the fluid property, and the well status.

Embodiment 20: The method of any of Embodiments 14-19, wherein the combination of functions is a first combination of functions, and wherein determining the first combination of functions comprises: determining a residual characteristic based on the first combination of functions and the measurement series using a difference between a measurement in the measurement series corresponding with a time point and a predicted value of the combination of functions at a same time point; and selecting the first combination of functions from a set of combinations based on the residual characteristic.

What is claimed is:

1. An apparatus comprising:
   a subsurface sensor for use in a borehole;
   a first processor;
   a second processor disposed at a different location from the first processor; and
   a machine-readable medium having program code to cause the apparatus to,
      obtain subsurface measurements measured by the subsurface sensor,
      generate a combination of functions based on the subsurface measurements using the first processor, wherein the combination of functions comprises a subset of functions from a library of basis functions,
      generate a set of characterizing values, wherein the set of characterizing values comprises a function identifier and corresponding function weight for at least one function from the combination of functions, and
      communicate the set of characterizing values to the second processor,
      using the second processor, generate a set of reconstructed measurement series based on the set of characterizing values and determine at least one of a formation property, a fluid property, and a well status based on the set of reconstructed measurement series.

2. The apparatus of claim 1, wherein the program code to communicate the set of characterizing values to the second processor comprises program code to:
   determine whether the functions in the combination of functions are different from previous functions in a previous selected combination of functions; and
   communicate the set of characterizing values based on a determination that the functions in the combination of functions are different from the previous functions in the previous selected combination of functions.

3. The apparatus of claim 1, wherein the program code to communicate the set of characterizing values to the second processor comprises program code to cause the apparatus to transmit the set of characterizing values through fluid telemetry, wherein the fluid telemetry comprises transmission of physical pulses through a fluid in the borehole.

4. The apparatus of claim 1, wherein a first value of the set of characterizing values is communicated using a first number of bits, and wherein a second value of the set of characterizing values is communicated using a second number of bits that is different from the first number of bits.

5. The apparatus of claim 1, further comprising program code executable by the second processor to:
   generate a reconstructed combination of functions based on the set of characterizing values; and
   generate the set of reconstructed measurement series based on the reconstructed combination of functions.

6. The apparatus of claim 1, further comprising program code to reduce a testing flow rate of a sample fluid being measured by the subsurface sensor based on at least one of the formation property, the fluid property, and the well status.

7. The apparatus of claim 1, wherein the combination of functions is a first combination of functions, and wherein the machine-readable medium further comprises program code to:
   produce a measurement series, wherein the measurement series is a set of the subsurface measurements over time,
   determine a residual characteristic based on the first combination of functions and the measurement series using a difference between a measurement in the measurement series corresponding with a time point and a predicted value of the combination of functions at a same time point; and
   select the first combination of functions from a set of combinations based on the residual characteristic.

8. The apparatus of claim 7, wherein the library of basis functions is a first library of basis functions, wherein the machine-readable medium further comprising program code to select the first library of basis functions from a plurality of libraries of basis functions based on the residual characteristic being less than at least one of a residual characteristics threshold and a second residual characteristic, wherein the second residual characteristic is determined based on a second combination of functions generated using a second library of basis functions.

9. One or more non-transitory machine-readable storage media comprising program code for determining at least one of a formation property, a fluid property, and a well status, the program code to:
   obtain subsurface measurements measured by a subsurface sensor in a borehole;
   generate a combination of functions based on the subsurface measurements using a first processor in the borehole, wherein the combination of functions comprises a subset of functions from a library of basis functions;
   generate a set of characterizing values, wherein the set of characterizing values comprises a function identifier and corresponding function weight for at least one function from the combination of functions;

communicate the set of characterizing values to a second processor at a different location from the first processor;

generate a set of reconstructed measurement series based on the set of characterizing values; and determine at least one of the formation property, the fluid property, and the well status based on the set of reconstructed measurement series.

10. The one or more non-transitory machine-readable storage media of claim 9, wherein the program code to communicate the set of characterizing values to the second processor comprises program code to:

determine whether the functions in the combination of functions are different from previous functions in a previous selected combination of functions; and communicate the set of characterizing values based on a determination that the functions in the combination of functions are different from the previous functions in the previous selected combination of functions.

11. The one or more non-transitory machine-readable storage media of claim 9, wherein the program code to communicate the set of characterizing values to the second processor comprises program code to transmit the set of characterizing values through fluid telemetry, wherein the fluid telemetry comprises transmission of physical pulses through a fluid in the borehole.

12. The one or more non-transitory machine-readable storage media of claim 9, wherein a first value of the set of characterizing values is communicated using a first number of bits, and wherein a second value of the set of characterizing values is communicated using a second number of bits that is different from the first number of bits.

13. The one or more non-transitory machine-readable storage media of claim 9, further comprising program code to reduce a testing flow rate of a sample fluid being measured by the subsurface sensor based on at least one of the formation property, the fluid property, and the well status.

14. A method for determining at least one of a formation property, a fluid property, and a well status, the method comprising:

obtaining subsurface measurements measured by a subsurface sensor in a borehole;

generating a combination of functions based on the subsurface measurements, wherein the combination of functions comprises a subset of functions from a library of basis functions;

generating a set of characterizing values, wherein the set of characterizing values comprises a function identifier and corresponding function weight for at least one function from the combination of functions;

communicating the set of characterizing values to a reconstruction processor at a different location from the subsurface sensor;

generating a set of reconstructed measurement series based on the set of characterizing values; and determining at least one of the formation property, the fluid property, and the well status based on the set of reconstructed measurement series.

15. The method of claim 14, wherein communicating the set of characterizing values to the reconstruction processor comprises:

determining whether the functions in the combination of functions are different from previous functions in a previous selected combination of functions; and communicating the set of characterizing values based on a determination that the functions in the combination of functions are different from the previous functions in the previous selected combination of functions.

16. The method of claim 14, wherein communicating the set of characterizing values to the reconstruction processor comprises transmitting the set of characterizing values through fluid telemetry, wherein the fluid telemetry comprises transmission of physical pulses through a fluid in the borehole.

17. The method of claim 14, wherein a first value of the set of characterizing values is communicated using a first number of bits, and wherein a second value of the set of characterizing values is communicated using a second number of bits that is different from the first number of bits.

18. The method of claim 14, further comprising:

generating a reconstructed combination of functions based on the set of characterizing values; and generating the set of reconstructed measurement series based on the reconstructed combination of functions.

19. The method of claim 14, further comprising reducing a testing flow rate of a sample fluid being measured by the subsurface sensor based on at least one of the formation property, the fluid property, and the well status.

20. The method of claim 14, further comprising:

producing a measurement series, wherein the measurement series is a set of the subsurface measurements over time;

determining a residual characteristic based on the combination of functions and the measurement series using a difference between a measurement in the measurement series corresponding with a time point and a predicted value of the combination of functions at a same time point; and selecting the combination of functions from a set of combinations based on the residual characteristic.

* * * * *